United States Patent [19]

Knopp et al.

[11] Patent Number: 5,397,111
[45] Date of Patent: Mar. 14, 1995

[54] ACTUATING DEVICE IN COMBINATION WITH A LOCKABLE CYLINDER PISTON UNIT

[75] Inventors: Axel Knopp, Eitelborn; Klaus Gitzinger, Waldesch, both of Germany

[73] Assignee: Stabilus GmbH, Koblenz-Neuendorf, Germany

[21] Appl. No.: 143,167

[22] Filed: Oct. 26, 1993

[30] Foreign Application Priority Data

Oct. 30, 1992 [DE] Germany .............. 42 36 732.8

[51] Int. Cl.[6] ............................. F16F 9/44
[52] U.S. Cl. ............................ 267/64.12; 188/300
[58] Field of Search .......... 267/64.12, 64.13, 64.22, 267/120, 131; 188/300, 322.17, 322.18; 248/161; 297/345

[56] References Cited

U.S. PATENT DOCUMENTS

| | | | |
|---|---|---|---|
| 4,756,496 | 7/1988 | Hosan et al. | 248/161 |
| 4,844,392 | 7/1989 | Bauer et al. | 267/131 X |

FOREIGN PATENT DOCUMENTS

| | | |
|---|---|---|
| 0483806 | 5/1992 | European Pat. Off. . |
| 2542182 | 3/1977 | Germany . |
| 7920645 | 10/1979 | Germany . |
| 2197708 | 5/1988 | United Kingdom ...... 267/64.12 |

Primary Examiner—Robert J. Oberleitner
Assistant Examiner—Peter M. Poon
Attorney, Agent, or Firm—Brumbaugh, Graves, Donohue & Raymond

[57] ABSTRACT

According to an illustrative example of the invention, a chair column comprises a lockable gas spring for height adjustment of the chair column. The gas spring is inserted into a stand tube of the chair column. The piston rod extends downwards and is rotatably fastened to a bottom part of the stand tube. The cylinder of the gas spring extends upwards out of the upper end of the stand tube. At the upper end of the cylinder there is provided in axial alignment with the axis of the cylinder a valve pin. A pushing member acts onto the valve pin. The pushing member is connected with a Bowden cable. One end of the Bowden cable core is fastened to a guide sleeve of the pushing member. The tube member of the Bowden cable acts onto the pushing member. The other end of the Bowden cable is connected to a releasing lever by which the valve can be opened. When the valve is opened, the working chambers located on both sides of a piston are interconnected so that height adjustment of the gas spring is possible.

27 Claims, 7 Drawing Sheets

Fig. 8

ACTUATING DEVICE IN COMBINATION WITH A LOCKABLE CYLINDER PISTON UNIT

BACKGROUND OF THE INVENTION

Lockable cylinder piston units are used e.g. in chair columns carrying a seat member for height adjustment of the seat member. They can also be used for positioning a back rest of a chair or the like. Moreover, they can be used for many industrial and household appliances where objects are to be positioned in various positions. There exists frequently the problem to provide a remote control of the locking system, e.g. in chairs the cylinder piston units for positioning the seat or the back rest should easily be controllable by the user of the chair when sitting on the chair.

STATEMENT OF THE PRIOR ART

From German Utility Model 79 20 645 it is known to unlock a lockable cylinder piston device by a Bowden cable. In this known embodiment, the Bowden cable is supported by one end of its tube member on a bracket which is fastened to the external end of the piston rod. The core of the Bowden cable extends beyond the end of the flexible tube which is supported by the bracket. This end of the core acts onto a lever such that this lever can act onto a pushing rod, which pushing rod passes through a central bore of the piston rod and acts onto a valve member provided in a passage between two fluid-filled working chambers of the cylinder piston unit. From this solution it appears quite clear that the men skilled in the art have seen in the past a necessity to provide a transmission linkage when using a Bowden cable for actuation of the pushing pin in order to transmit the pulling action of the Bowden cable's core into a pushing action necessary for actuation of the pushing pin. The transmission means necessary for transmitting the pulling action of the Bowden cable core to the pushing pin require a considerable space which is in many appliances not available.

From German Patent Publication DE-AS 25 42 182 adjusting elements for vehicle seats are known in which an automatic adjustment of the spring action of a gas spring occurs in response to the weight of the user of the seat. For adjustment of the height of the seat body a pushing pin is actuated by means of an actuating device. A valve body is lifted from the valve seat so that flow passages are opened. Such, a first piston within a working cylinder can be displaced upwards, until the desired height of the seat is achieved. The actuating device is provided at the bottom of the cylinder. An actuating device is not described in detail.

OBJECT OF THE INVENTION

It is a first object of the present invention to provide an actuating device for combination with a lockable cylinder piston unit in using a Bowden cable such that the connection of the Bowden cable with the cylinder piston unit requires a minimum of space.

A further object is to provide an actuating device for combination with a lockable cylinder piston unit which can easily be combined with the cylinder piston unit.

A further object is to provide a highly reliable and secure operational connection between the actuating device and the lockable cylinder piston unit.

A further object of the present invention is to combine an actuating device and a lockable cylinder piston unit such that the transmission path between the operator's input member of the actuating device and a locking valve of the cylinder piston unit can be freely selected and easily installed.

SUMMARY OF THE INVENTION

In consideration of at least one of the above-mentioned objects an actuating device is combined with a lockable cylinder piston unit.

The cylinder piston unit comprises a cylinder unit having a cylinder unit axis and two ends. A cylinder cavity is defined axially between the two ends. The cylinder piston unit further comprises a piston rod axially movable through at least one of the two ends. A piston unit is connected to the piston rod inside the cylinder cavity and separates two fluid-filled working chambers from each other inside the cavity. Fluid flow passage means are provided for interconnecting the two working chambers. Valve means are allocated to the fluid flow passage means for selectively opening or closing the fluid flow passage means. The valve means are operatively connected with a pushing member having a pushing axis. The pushing member is guided by pushing member guide means along the pushing axis. The fluid flow passage means is opened through the valve means in response to pushing the pushing member between a pushing member closing position and a pushing member opening position. The actuating device comprises a Bowden cable having a first end portion in operational connection with the pushing member and a second end portion in operational connection with a Bowden cable operating mechanism. The Bowden cable comprises a flexible tube member and a flexible core member guided within the flexible tube member. The flexible tube member has a first end portion adjacent the first end portion of the Bowden cable and the flexible core member has a first end portion adjacent the first end portion of the Bowden cable. The first end portion of the flexible tube member is supported in a direction substantially parallel to the pushing axis by the pushing member. The first end portion of the core member is fastened by fastening means substantially fixed with respect to the pushing member guide means at least in a direction parallel to the pushing axis.

Due to a substantially direct pushing action of the flexible tube member onto the pushing member, complicated transmission means as used in the past can be avoided such that the space requirement of the actuating device at the location of the operational connection between the cylinder piston unit and the first end of the Bowden cable are minimized.

The first end portion of the core member preferably extends beyond the first end portion of the tube member. In this case, the first end portion of the core member may extend through internal core member passage means of the pushing member between an exit of the tube member and the fastening means. This again provides a most compact design of the cylinder piston unit at the location of its connection with the Bowden cable.

The tube member may be supported by a tube member support face of the pushing member. This support face may be substantially orthogonal with respect to the pushing axis.

The tube member support face may be adjacent lateral positioning means positioning the first end portion of the tube member with respect to the pushing member in directions transverse to the pushing axis. Preferably, the first end portion of the tube member is received by a bore or hole of the pushing member, which bore is substantially parallel or coaxial with respect to the pushing axis. This bore may have a bottom face providing a support face for the tube member and a side face acting as lateral positioning means for the first end portion of the tube member. Internal core member passage means may be provided and extend inside the pushing member between the tube member support face and the fastening means by which the core member is anchored.

The core member passage means may be provided by a laterally open slot of the pushing member. This is a most convenient design, because the attachment of the Bowden cable to the cylinder piston unit is facilitated.

The first end portion of the tube member may be provided with a tube member support sleeve or nipple to be supported by the pushing member. Alternatively, the tube member may directly engage the support face of the pushing member.

The first end portion of the core member may extend directly from the exit of the first end portion of the tube member toward a fastening location radially outside the pushing member and stationary with respect to the pushing member guide means. In this case, the first end portion of the core member may extend from the first end portion of the tube member toward the fastening location along a path inclined with respect to the pushing axis. The inclination is selected such that lateral forces are as small as possible.

The pushing member guide means may be provided by a guide sleeve. This guide sleeve may be inserted into a guide sleeve receiving cavity of the cylinder piston unit. In such a design, a fastening means location for the first end portion of the core member may be provided on the guide sleeve. The guide sleeve may be fastened within the guide sleeve receiving cavity. This is a most convenient design, because the fastening of the first end portion of the core member is facilitated. The first end portion of the core member may be fastened to the guide sleeve before the guide sleeve is inserted into the guide sleeve receiving cavity. Such, a preassembled unit may be provided comprising the guide sleeve, the pushing member and the Bowden cable. This preassembled unit may be easily attached to the cylinder piston unit by inserting the guide sleeve into the guide sleeve receiving cavity and fastening the guide sleeve within this cavity. A most convenient design is obtained, when the guide sleeve is fastened within the guide sleeve receiving cavity by snapping engagement means of the guide sleeve and the guide sleeve receiving cavity mutually engageable in response to inserting the guide sleeve into the guide sleeve receiving cavity. Moreover, the guide sleeve may be provided with at least one projection, which projection is engageable and preferably snappingly engageable into a recess adjacent the guide sleeve receiving cavity.

By using snapping engagement the connection between the preassembled unit and the cylinder piston unit can be most easily achieved. The snapping engagement may be such that it can be released again, e.g. by a releasing tool.

The first end portion of the core member as mentioned above may follow a direct path from the exit of the Bowden tube to a fastening location of the guide means. Alternatively, the first end portion of the core member may be engaged with a core member fastening means which is stationary with respect to the pushing member guide means and extends into recess means of the pushing member. These recess means must be such as to permit axial play to the pushing member with respect to the pushing member guide means.

The pushing member may be biased by resilient means toward the pushing member closing position. These resilient means may be provided by a pressurized fluid within the working chambers, which pressurized fluid acts onto the pushing member through a valve body exposed to the pressurized fluid.

The pushing member may be integral with valve body shaft means of the valve means. Alternatively, the pushing member may be in abutting engagement with valve body shaft means of the valve means. This latter embodiment is preferable in view of easily connecting the Bowden cable with the cylinder piston unit.

The pushing member has a Bowden cable side end face. This end face may be located inside a guide means cavity of the guide means. Then, the Bowden cable extends into the guide means cavity and the connection means between the Bowden cable and the cylinder piston unit are automatically protected.

The fluid flow passage means may extend across the piston member through at least one of the piston member and the piston rod. In such an embodiment, the valve means may be controllable through an axial bore of the piston rod, and the pushing member guide means may be provided at least partially inside the axial bore of the piston rod.

According to a preferred embodiment, however, the fluid flow passage means comprise an external bypass of the cylinder unit. Then, the valve means may be provided at an end of the cylinder unit remote from the piston rod. This embodiment is most convenient, when the end of the cylinder unit remote from the piston rod is stationary with respect to an object, which object carries the operating mechanism of the Bowden cable. This is particularly true for chair columns in which the seat member is fastened to the cylinder at the cylinder end which is remote from the piston rod. The piston rod is in such case free of any connection with the actuating mechanism and the Bowden cable is substantially stationary with respect to the group of components comprising the cylinder unit and the chair seat.

The pushing member, when arranged at the end of the cylinder remote from the piston rod is preferably substantially coaxial with the cylinder unit axis.

The cylinder unit may comprise a tubular extension extending beyond a terminal plug member accommodating the valve means. A spacer sleeve may then be accommodated within the tubular extension axially adjacent the terminal plug member, and this spacer sleeve may be used as a part of the guide means for the pushing member. Preferably, a guide sleeve is inserted into the spacer sleeve. It is, however, also possible that the spacer sleeve directly guides the pushing member and that the core member is fastened to the spacer member. The tubular extension may be part of the cylinder unit itself, e.g. it may be an extension of an external cylinder of the cylinder unit which forms together with an internal cylinder of the cylinder unit a bypass path interconnecting two working chambers. Alternatively, the tubular extension may be also a part of a protection tube which surrounds the cylinder unit.

The cylinder piston unit may be a pneumatic or hydropneumatic spring which even in locked condition has still some spring characteristics in at least one axial direction. Further, the cylinder piston unit may be a hydraulic or hydropneumatic locking device. By a hydraulic locking device we understand particularly a cylinder piston unit in which both ends of the cylinder unit are provided with an opening such that the piston rod extends through one of these openings, and a piston rod extension having a diameter equal to the diameter of the piston rod extends through the other end. Such a hydraulic locking device is e.g. known from U.S. Pat. No. 4,785,921. Even in such a locking device one of the working chambers may be exposed to resilient means. These resilient means may be provided by a pressurized gas. In the latter case, one can designate the cylinder piston unit as a hydropneumatic locking device.

The cylinder piston unit may be used as a positioning unit for at least one of a seat member or a back rest member of a chair. In this case, the Bowden cable operating mechanism may be provided on the chair at a position accessible to a person sitting on the chair.

According to a further aspect of the present invention, a preassembled actuating device unit comprises the pushing member guide means, the pushing member and the Bowden cable with the first end portion of the core member being fastened to the guide means and the first end portion of the tube member being supportable by the pushing member. Then, the guide means may be shaped for fastening engagement with the cylinder piston unit.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
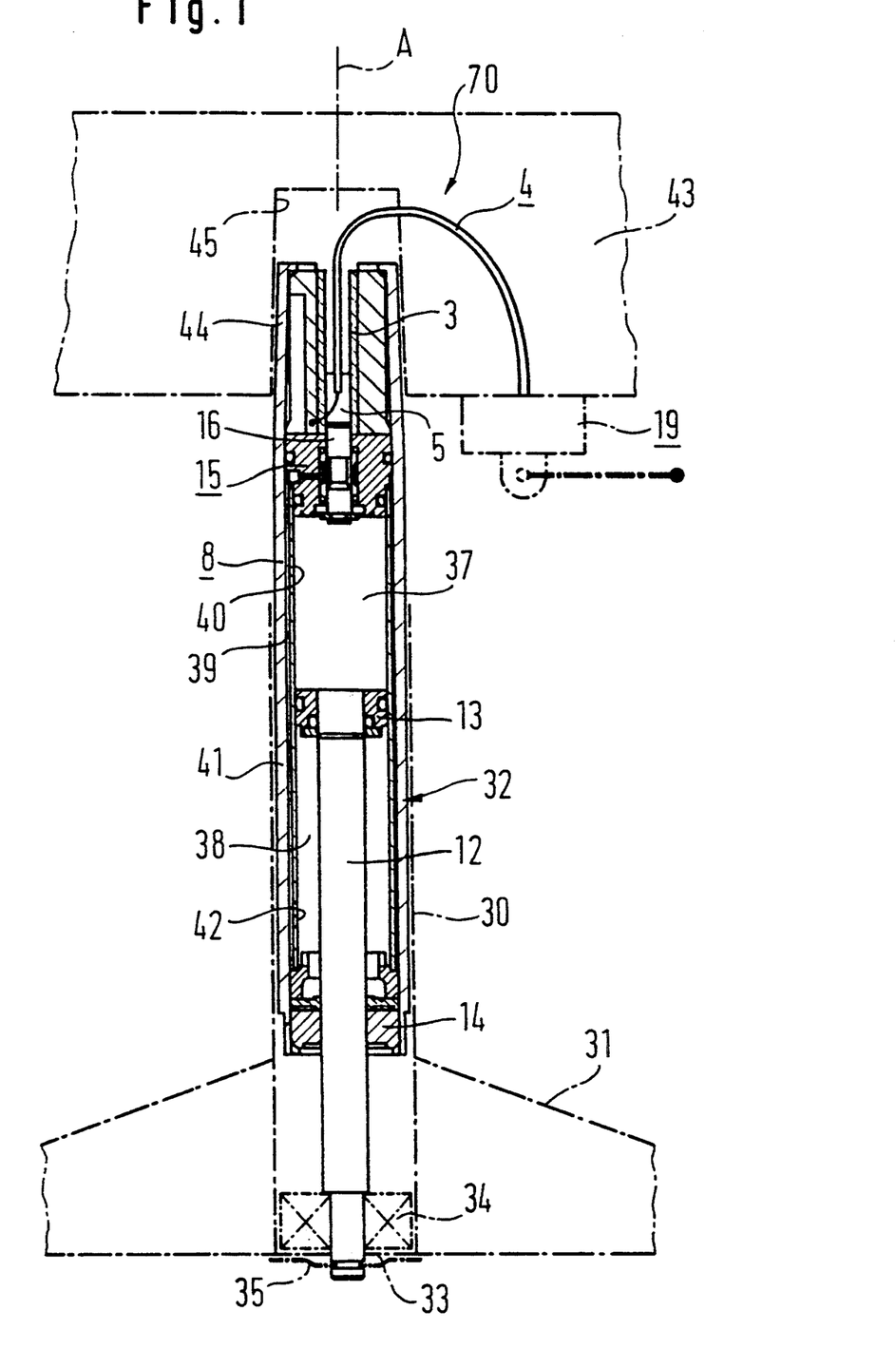
FIG. 1 shows a chair column with a lockable gas spring and with an actuating device in combination with the gas spring.

In FIG. 1 a stand tube 30 of a chair column is shown. This stand tube 30 is fastened to a base plate 31 or a plurality of legs by which the chair column rests on a bottom face.

A gas spring 32 is inserted into the stand tube 30. The gas spring 32 comprises a piston rod 12 which is supported by a bottom plate 33 of the stand tube 30 through a ball bearing 34 such that the piston rod 12 is freely rotatable with respect to the stand tube 30. The lower end of the piston rod 12 is secured in axially upward direction with respect to the bottom plate 33 by a spring clip 35 or the like.

The gas spring further comprises a cylinder 8 with a piston rod guiding and sealing unit 14 at the lower end thereof. The piston rod 12 passes through this guiding and sealing unit 14 and is connected inside the cylinder 8 with a piston member 13. The piston member 13 divides the cavity within the cylinder 8 into two working chambers 37 and 38. These working chambers are filled with a pressurized gas. The two working chambers 37 and 38 are interconnected through an annular bypass channel 39 surrounding the cylinder and defined between an inner tube member 40 and an outer tube member 41 of the cylinder. The annular bypass passage 39 is connected with the working chamber 38 through a radial bore of the inner tube member 40 provided at 42 and is connected to the other working chamber 37 through a valve unit 15 provided at the upper end of the cylinder 8. In FIG. 1, the valve unit 15 is closed. This means that the two working chambers 37 and 38 are separated from each other and the piston rod 12 is thereby locked with respect to the cylinder 8. Due to the fact that the working chambers 37 and 38 are filled with a pressurized gas, a certain resiliency of the piston rod 12 with respect to the cylinder 8 may exist.

At the upper end of the cylinder 8 a seat member 43 is fixed to a conical end portion 44 of the cylinder 8 by a corresponding conical bore 45. At the lower side of the seat member 43 there is provided a Bowden cable operating mechanism 19 which is connected through a Bowden cable 4 with the valve unit 15 such as to act onto a pushing member 5, which pushing member 5 acts through a mutual abutment onto a valve pin 16. When a person wants to adapt the height of the chair column to its personal requirements, this person may act onto the operating mechanism 19 such as to open the valve unit 15. Then pressurized gas can flow between the working chambers 37 and 38 and the height of the chair column can be varied. The pressurized gas within the working chambers 37 and 38 acts onto the cross-sectional area of the piston rod 12 such that in response to opening of the valve unit 15, the cylinder 8 is moved upwards by the biasing action of the pressurized gas. The pressure of the pressurized gas is adapted to the weight of the person sitting on the seat member 43 so that the weight of the person is substantially in balance with the expelling force exerted by the pressurized gas onto the piston rod 12. Such, the person sitting on the seat can easily adjust the height of the chair column to the personal requirements and can after having adjusted the desired height close the valve unit 15 again by releasing the Bowden cable operating mechanism 19 with the result that the selected height of the chair column is fixed. For more details of gas springs reference is made to the U.S. Pat. No. 4,756,496 and the European Patent Publication 483 806 A1.

Figure 2:
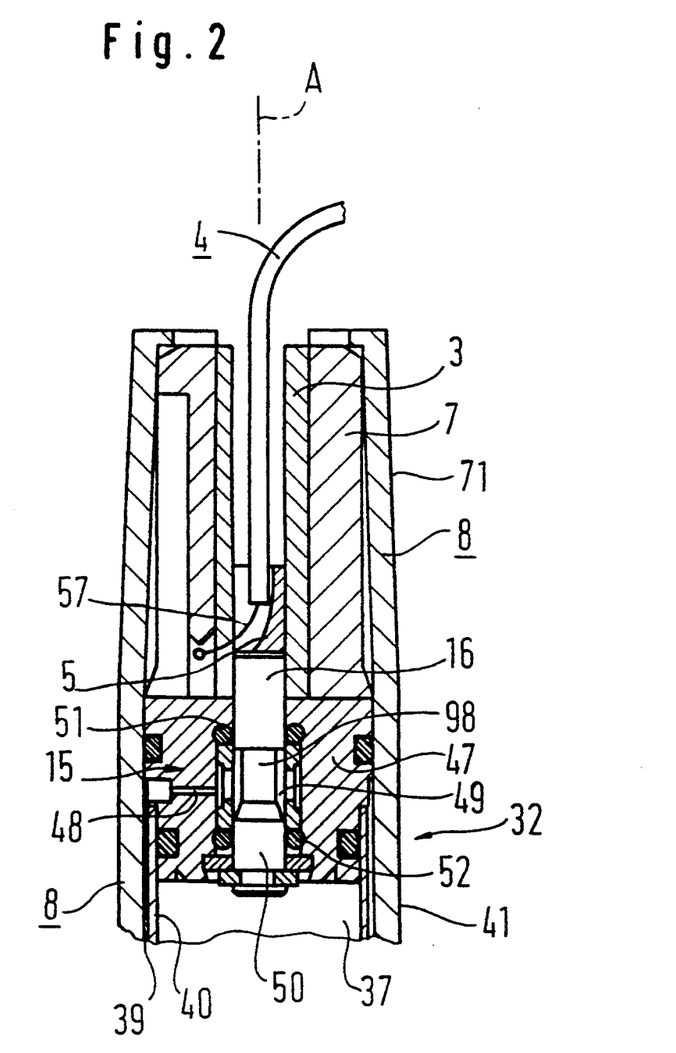
FIG. 2 shows the bottom end of the gas spring with a bottom valve and a part of the actuating mechanism, said bottom end of FIG. 2 corresponding to the upper end of the gas spring of FIG. 1.

In FIG. 2 one can see more details of the valve unit 15. The valve unit 15 is provided within a terminal plug 47 of the cylinder 8. This terminal plug closes the upper end of the working chamber 37. The annular bypass passage 39 is connected with the working chamber 37 through a radial bore 48 and a valve chamber 49. The valve pin 16 is integral with a valve body and is guided within the terminal plug 47 through annular sealing members 51 and 52. Valve body 50 is provided with a section 98 of reduced diameter. When the valve body 50 is pressed downwards against the action of the pressurized gas within the working chamber 37 by downward pushing of the valve pin 16, the section 98 of reduced diameter crosses the lower annular sealing member 52 such that the annular bypass passage is connected for fluid flow through the radial bore 48 and the valve chamber 49 with the working chamber 37. Then, the working chambers 37 and 38 as shown in FIG. 1 are interconnected for free gas passage, and height adjustment can be performed. One can further see from FIG. 2 that the pushing member 5 acts on the valve pin 16 such that by pushing downwards the pushing member 5 the valve pin 16 can be pressed downwards and the valve unit 15 can such be opened. The pushing member 5 is connected with the Bowden cable 4. The connection of the Bowden cable 4 with the pushing member 5 will be described in more detail with reference to FIGS. 3 and 4. The Bowden cable 4 comprises a flexible tube member 53 and a core member 54 guided within the flexible tube member 53. The tube member 53 is received by a bore 55 of the pushing member 5 This bore 55 is equal to or somewhat larger in diameter than the outer diameter of the flexible tube 53 so that the end portion 56 of the flexible tube 53 is laterally guided by the bore 55. The end face of the end portion 56 of the tube member 53 is axially supported by the bottom face 59 of the bore 55. An end portion 57 of the core member 54 extends beyond the end portion 56 of the flexible tube 53. This end portion 57 of the core member 54 is provided with a fastening member 18. The fastening member 18 is anchored within a slot 60 of a guide sleeve 3. This guide sleeve 3 is intended for axially guiding the pushing member 5 along the axis A. The guide sleeve 3 is stationary with respect to the cylinder 8, as will be described later in more detail, The end portion 57 of the core member 54 passes through a slot 10 of the pushing member 5. This slot extends along the total length of the pushing member 5 and intersects with the bore 55. The guide sleeve 3 is received within a cavity 61 stationary with respect to the cylinder 8 and can be inserted into this cavity 61 as described later in more detail.

When the guide sleeve 3 is still outside the cavity 61 during an intermediate phase of assembly, the end portion 56 of the flexible tube member can be inserted into the bore 55 and the end portion 57 of the core member 54 can be positioned within the slot 10. Then, the pushing member 5 can be inserted into the guide sleeve 3 and the fastening member 18 can be inserted into the fastening slot 60 of the guide sleeve 3. Then, the assembly consisting of the pushing member 5, the guide sleeve 3, the flexible tube member 53 and the flexible core member 54 can be inserted into the cavity 61 and can be secured therein. The operating mechanism 19 for the Bowden cable comprises a bracket 63 which can be fastened to the lower side of the seat member 43 in FIG. 1. On this bracket 63 an operating lever 64 is rotatably mounted. An end portion 65 of the flexible tube member 53 is supported by the bracket 63, and an end portion 66 of the core member 54 is fastened to the operating lever 64 by a fastening member 67. The operating mechanism 19 may be preassembled with the Bowden cable 4 in the preassembling phase in which the pushing member 5 and the guide sleeve 3 are preassembled with the end portion 57 of the core member 54 and the end portion 56 of the tube member 53. Thus, one can provide a preassembly comprising the Bowden cable 4, the complete operating mechanism 19, the pushing member 5 and the guide sleeve 3. For completing the combination of the gas spring 32 with the preassembled actuating device designated in its totality by 70, it is only necessary to insert the guide sleeve 3 into the cavity 61 and to fasten the guide sleeve 3 within this cavity 61.

Figure 3:
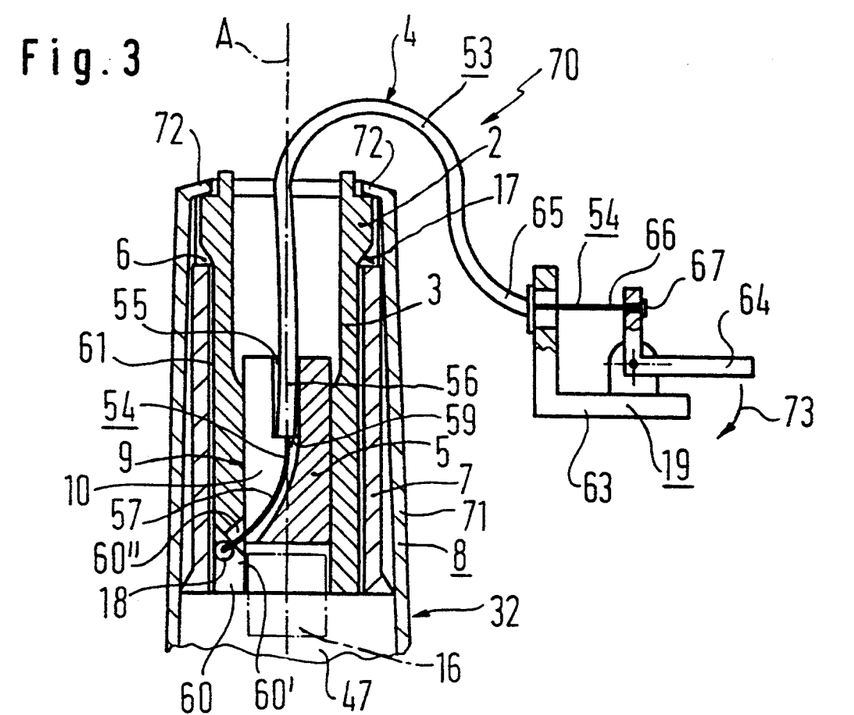
FIG. 3 shows the actuating device of FIG. 1 in more detail in a position corresponding to the locking position of the gas spring.

The cavity 61 is provided by a spacer sleeve 7. This spacer sleeve 7 extends inside a prolongation 71 of the cylinder 8 between the terminal plug 47 as shown in more detail in FIG. 1 and a radially inwards directed flange 72 of the prolongation 71. The upper end portion of the spacer sleeve 7 is provided with a plurality of recesses 6 distributed about the axis A. The guide sleeve 3 is provided at its upper end as shown in FIG. 3 with a plurality of segments 2 which are resilient in radial direction. These resilient segments are shaped as radially outward directed projections which can enter into the recesses 6. The segments 2 are provided with tapered faces 17 which can engage, when the guide sleeve 3 is axially inserted into the cavity 61 the radially inward directed flange 72 so that the segments 2 are deflected radially inwards in response to further axial movement of the guide sleeve 3. Finally, the segments 2 snap into the recesses 6 and below the radially inward directed flange 72 such that the guide sleeve 3 is then axially and angularly fixed with respect to the spacer sleeve 7. The spacer sleeve 7 is on the other hand also axially and angularly fixed with respect to the prolongation 71 of the cylinder 8. It is to be noted that according to FIG. 3, the lower end face of the pushing member 5 is opposite to the upper end face of the valve pin 16.

Figure 4:
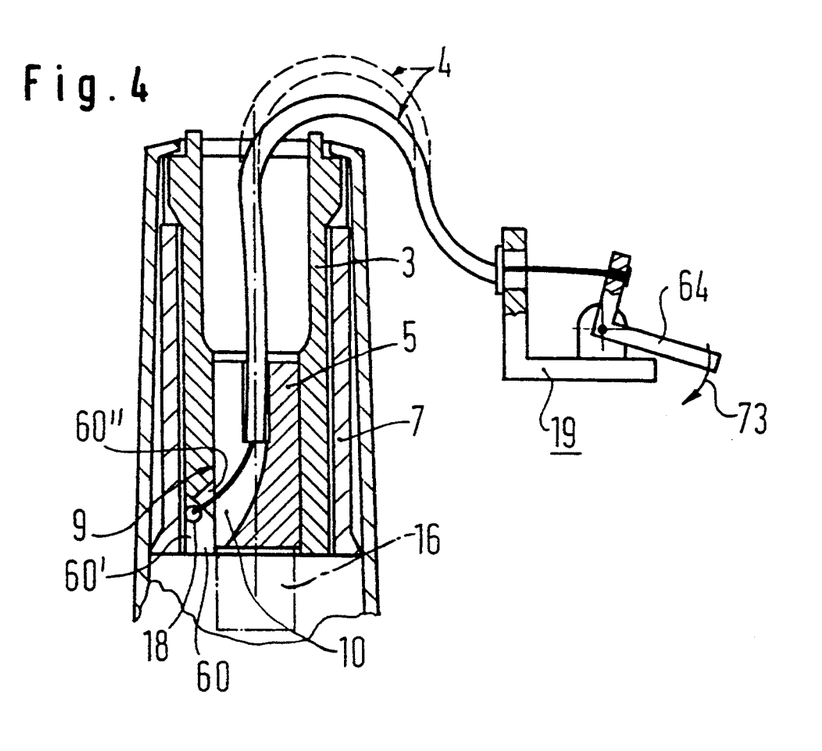
FIG. 4 shows the actuating device of FIG. 3 in a position corresponding to the unlocking position of the gas spring.

For opening the valve unit 15 as shown in FIG. 2, it is necessary to press the valve pin 16 downwards by downward movement of the pushing member 5. For obtaining a downward movement of the pushing member 5 the operating lever 64 is rotated with respect to the bracket 19 in the direction of arrow 73. As a result thereof the end portion 66 of the core member 54 is prolonged with respect to the end portion 65 of the tube member 53. Correspondingly, the end portion 57 of the core member 54 is shortened with respect to the end portion 56 of the flexible tube member 53. As the fastening member 18 is stationary with respect to the guide sleeve 3 and the guide sleeve 3 is stationary with respect to the cylinder 8, the shortening of the core end portion 57 results necessarily in a downward movement of the pushing member 5 at the support face 59. Thus, the pushing member 5 slides downward along the guide face 9 of the guide sleeve 3 and acts onto the valve pin 16 such as to open the valve unit 15. This is shown in FIG. 4. FIG. 4 shows the Bowden cable 4 in full lines, when the operating lever 64 has been rotated in the direction of arrow 73 in the valve opening sense and shows in dotted lines the position of the Bowden cable, when the operating lever 64 is in its rest position as shown in FIG. 3.

It should be observed that the width of the slot 10 is preferably smaller than the diameter of the bore 55 thus that the position of the end portion 56 of the flexible tube 53 is secured. It is sufficient, when the width of the slot 10 is equal to or preferably somewhat larger than the diameter of the core member 54.

It should be noted also that the slot 60 must have a first section 60' accommodating the fastening member 18 of the core member 54 and a second section 60" of reduced width so that the fastening member 18 is located at the transition between the two sections. When preassembling the actuating device 70 one can combine the Bowden cable 4 with the pushing member 5 before entering the pushing member 5 into the guide sleeve 3. Hereupon, the pushing member 5 may be inserted into the guide sleeve 3 from the lower end thereof as shown in FIG. 3 and the fastening member 18 may be laid into the slot 60'. A preassembly securing means may be provided for maintaining the coherence of the pushing member 5, the guide sleeve 3 and the end portions 56, 57 of the Bowden cable 4 until inserting the guide sleeve 3 into the cavity 61. Securing means may be provided e.g. by a plug frictionally inserted into the lower end of the guide bore 9 of the guide sleeve 3 or by a self-adhesive tape. It is easily understandable that other methods of assembling are possible. So it is possible to insert in a first step the pushing member 5 into the guide sleeve 3, then to insert the end portions 56 and 57 of the Bowden cable 4 into the bore 55 and the slot 10, respectively, then to bend the end portion 57 of the core member 54 into the slot 60 of the guide sleeve 3 and then to provide the fastening member 18 at the end of the end portion 57 of the core member 54.

Figure 5:
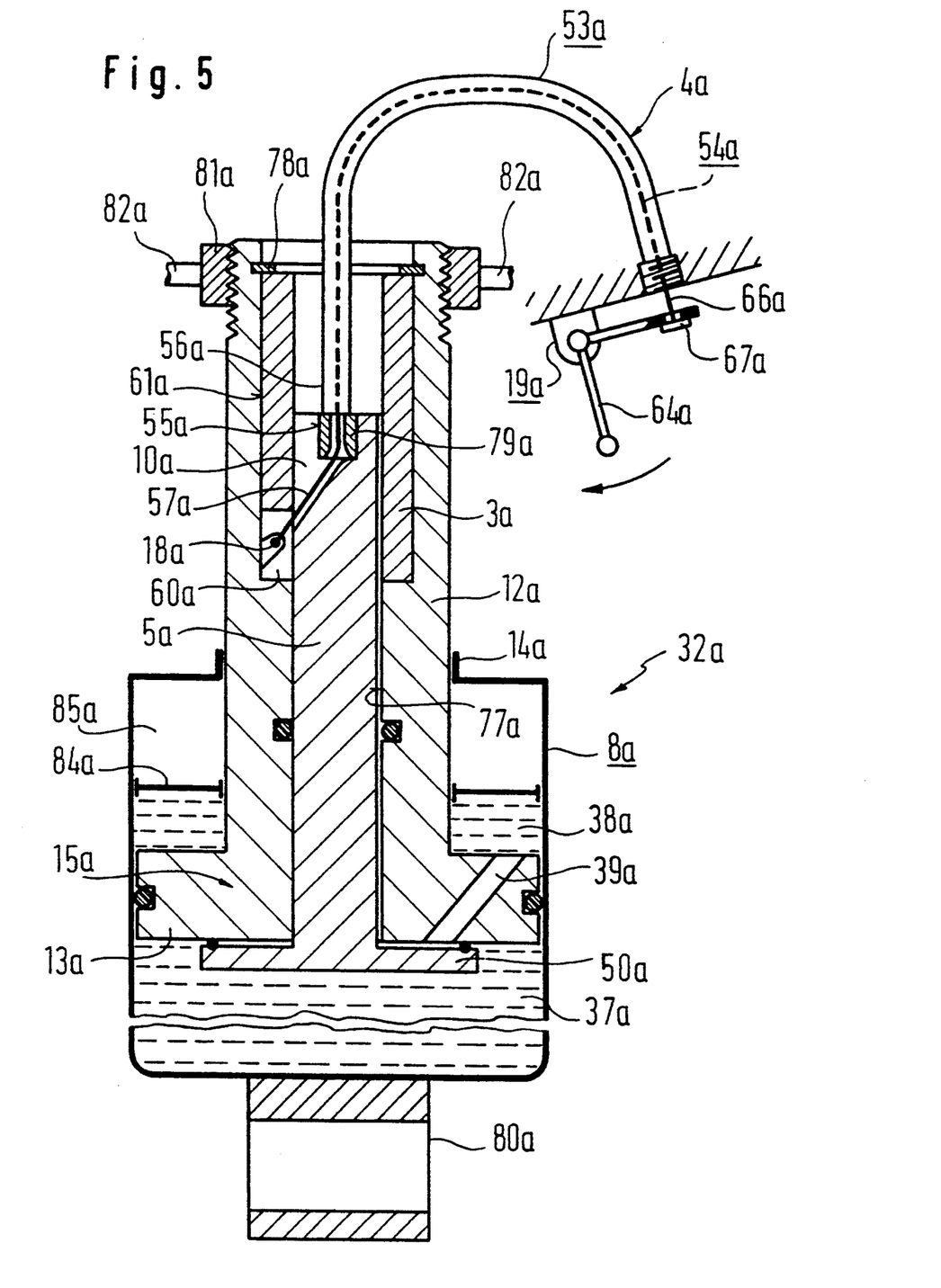
FIG. 5 shows in diagrammatic view a further embodiment of a gas spring with an actuating device attached thereto.

In FIG. 5 there is shown a modified gas spring 32a. For more details it is referred to FIG. 4 of the European Patent Publication 483 806A1. Analogous parts are designated with the same reference numerals as in FIGS. 1 to 4 supplemented by the index a.

In the embodiment of FIG. 5, the passage 39a interconnecting the working chambers 37a and 38a extends through the piston member 13a. The valve member 50a is shown as a disc-shaped valve member, may be replaced, however, by a valve body as shown in FIG. 2 at 50. The valve body 50a is here integral with the valve pin 5a. The valve pin 5a extends through an axial bore 77a of the piston rod 12a. It is easily understandable that the working chambers 38a and 37a can be interconnected by pressing downwards the valve pin 5a and the disc-shaped valve body 50a. The cavity accommodating the guide sleeve 3a is provided by enlarging the diameter of the bore 77a at 61a. The guide sleeve 3a is axially fixed by an elastic securing ring 78a. The end portion 56a of the flexible tube 53a is provided with a nipple 79a inserted into the bore 55a. In this embodiment, the guide sleeve 3a may be preassembled with the Bowden cable 4a by entering the fastening member 18a into the slot 60a of the guide sleeve 3a. Then the guide sleeve 3a may be inserted into the cavity 61a in such orientation that the nipple 79a finds its way into the bore 55a and the end portion 57a of the core member 54a finds its way into the slot 10a. Hereupon, the guide sleeve 3a may be secured by the securing ring 78a. The lower end of the cylinder 8a is provided with a fastening eye 80a, and the upper end of the piston rod 12a is provided with a fastening ring 81a having pivot pins 82a. In the embodiment of FIG. 5 it is indicated that the working chambers 37a and 38a may be filled with a liquid. In this case, a floating separating wall 84a may be provided for separating the working chamber 38a from compensation chamber 85a filled with a pressurized gas. The floating wall 84a may also be provided within the working chamber 37a and separate working chamber 37a from a volume of pressurized gas.

Figure 6:
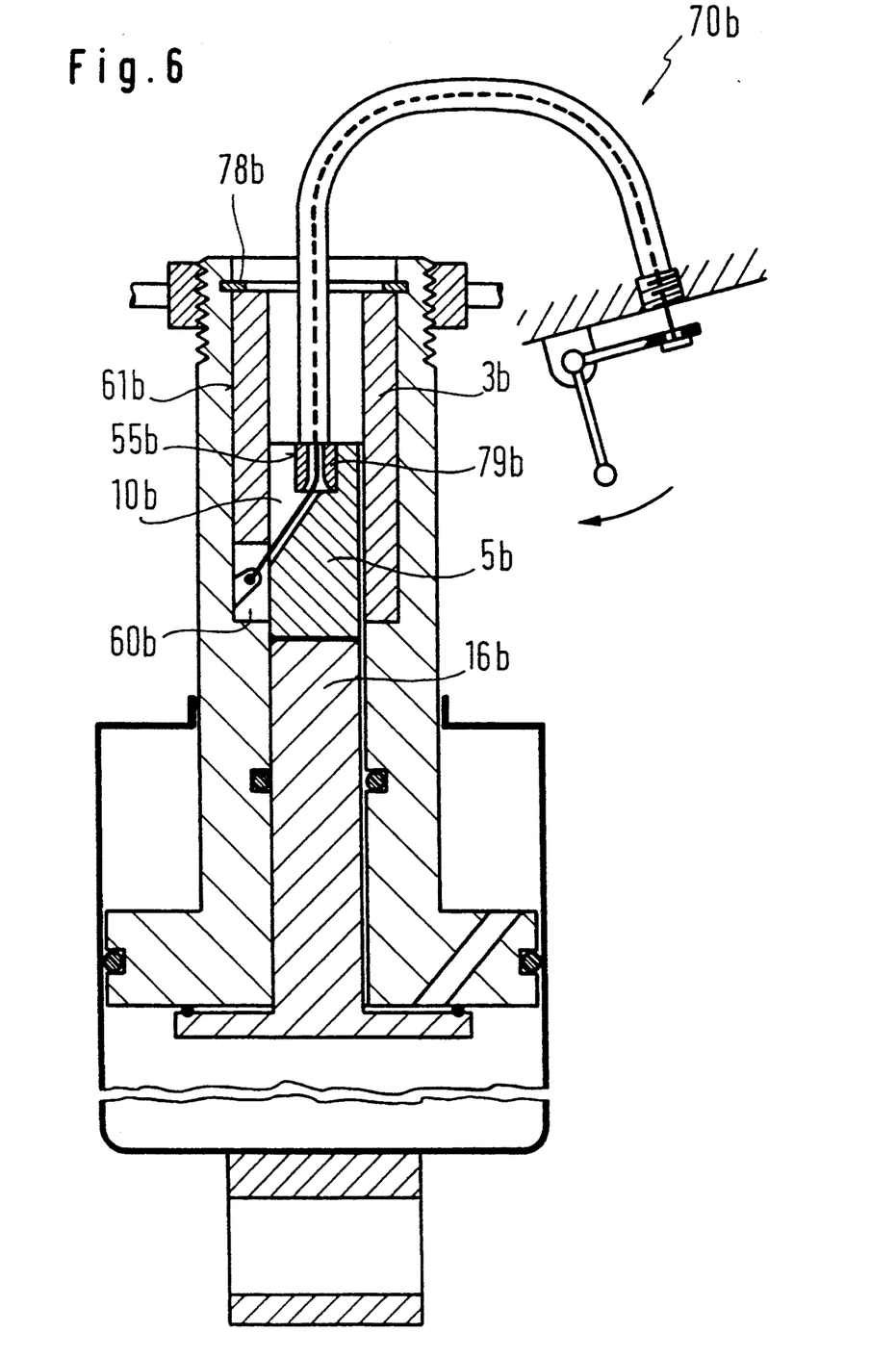
FIG. 6 shows a still further embodiment of the gas spring with the actuating device attached thereto.

The embodiment of FIG. 6 is very similar as compared with the embodiment of FIG. 5. The only differences are as follows: The valve pin 16b is separated from the pushing member 5b, as it was shown in the embodiment of FIGS. 1 to 3. In this embodiment of FIG. 6, the preassembled actuating device may be preassembled as was discussed with reference to FIGS. 1 to 4. Then, the guide sleeve 3b may again be inserted into the cavity 61b and fastened therein.

Figure 7:
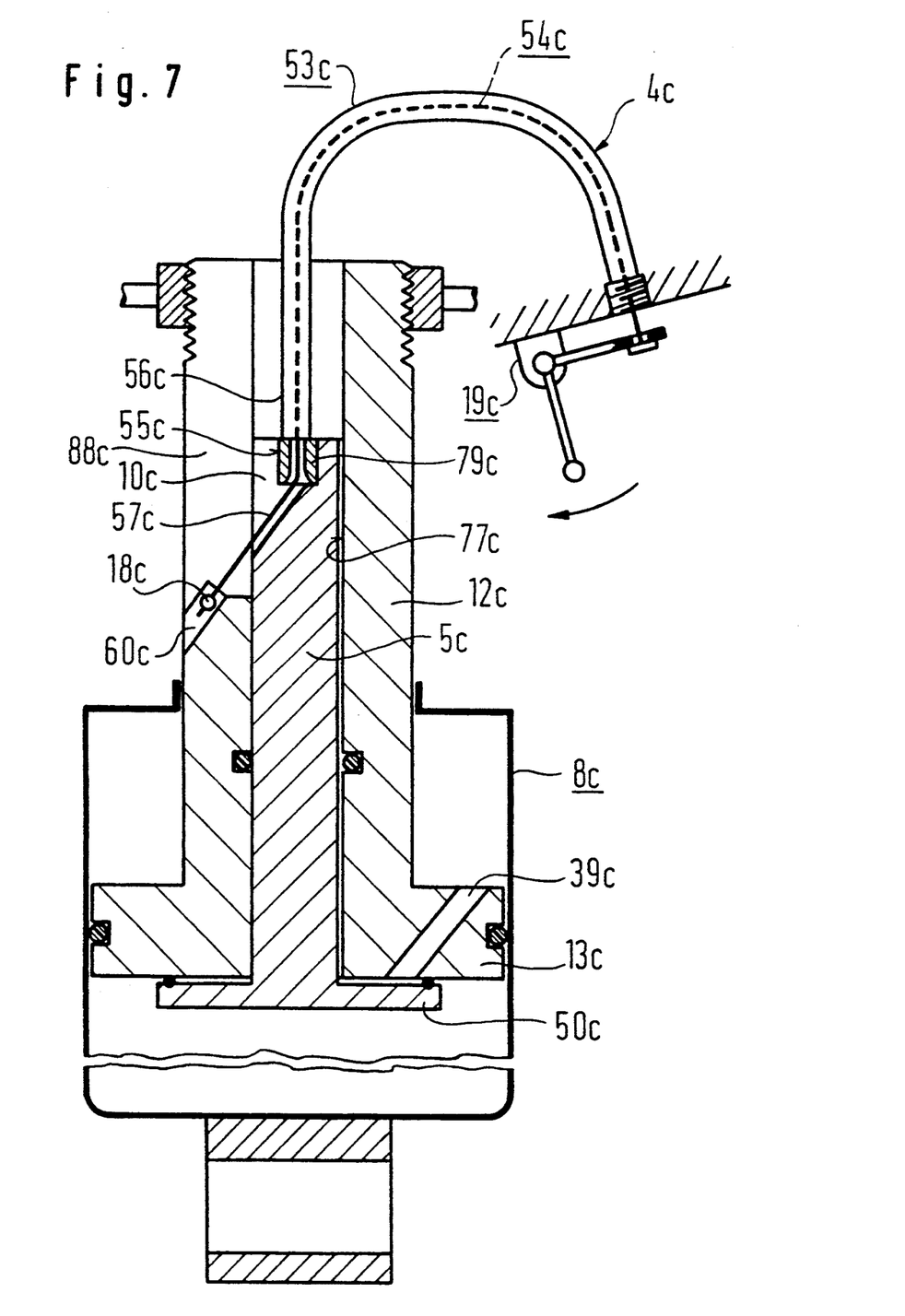
FIG. 7 shows a still further embodiment of the gas spring with the actuating device attached thereto and FIG. 8 shows a still further embodiment of a gas spring with the actuating device attached thereto.

The embodiment of FIG. 7 is again very similar to the embodiments of FIGS. 5 and 6. In the embodiment of FIG. 7, the pushing member 5c is again integrally coherent with the valve body 50c. The guide sleeve has been eliminated. The piston rod 12c is provided with a slot 88c. In this embodiment, the operating mechanism 19c may be preassembled with the Bowden cable 4c and the nipple 79c. The end portion 56c of the flexible tube member 53c can here be entered into the piston rod bore 77c while guiding the end portion 57c of the core member 54c through the slot 88c of the piston rod 12c. So, the nipple 79c can be entered into the bore 55c and the end portion 57c of the core member 54c can be entered into the slot 88c. Finally, the fastening member 18c can be secured in a recess 60c adjacent the slot 88c of the piston rod.

Figure 8:
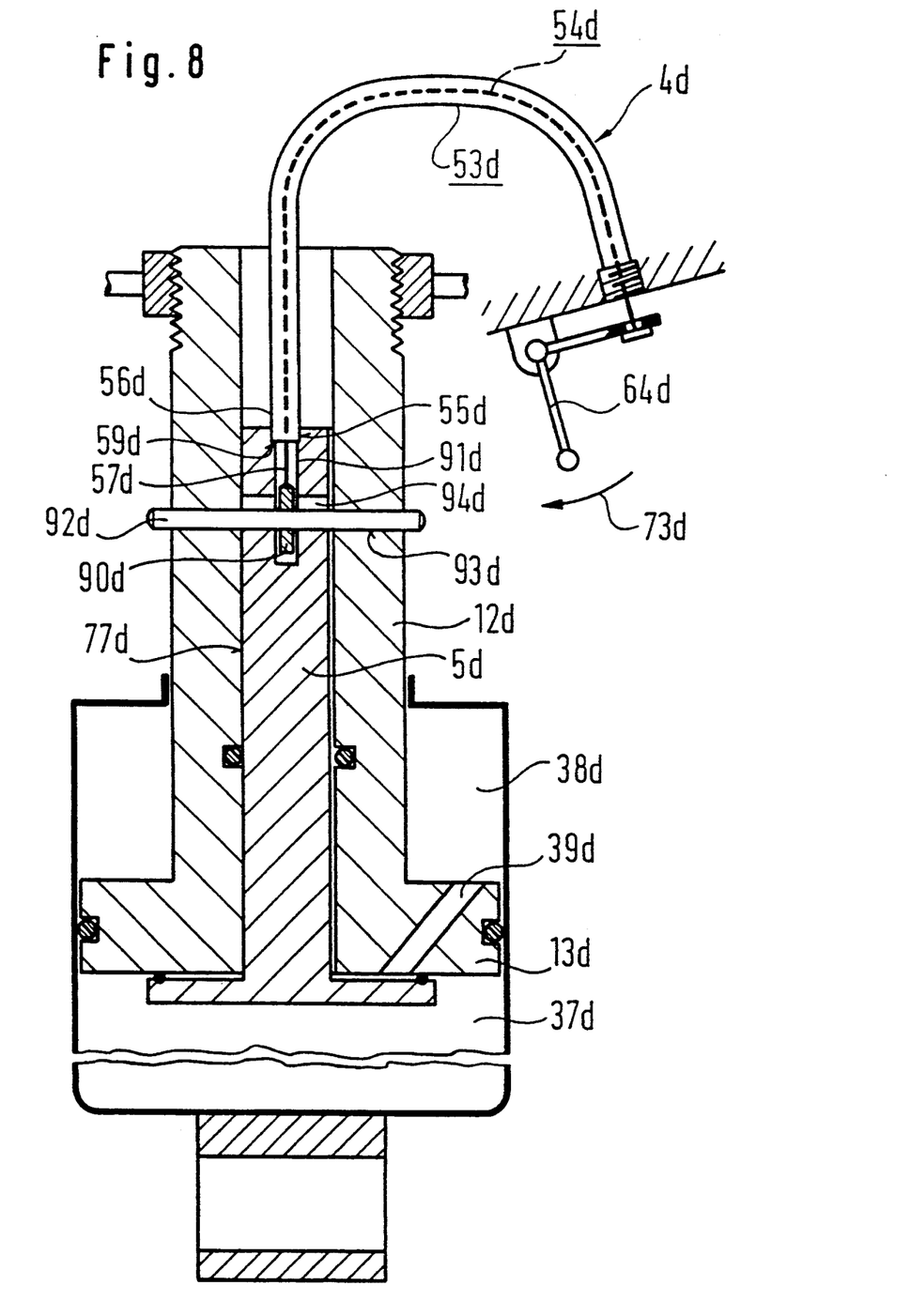

The embodiment of FIG. 8 is very similar to the embodiments of FIGS. 5 to 7. The differences are as follows: The end portion 56d of the flexible tube 53d is seated on support face 59d of the bore 55d. The end portion 57d of the core member 54d is provided with an eyelet 90d which can be entered through the bore 55d into a prolongation 91d of the bore 55d, which prolongation has a reduced diameter. A fastening pin 92d passes through a diametrical bore 93d of the piston rod 12d. This fastening pin 92d passes also through an elongated diametrical hole 94d of the pushing member 5d. Further, it passes through the eyelet 90d. The Bowden cable 4d can be connected to the pushing member 5d by inserting the eyelet 90d into the prolongated bore 91d and the end portion 56d of the flexible tube 53d into the bore 55d until abutting the support face 59d. Then, the fastening pin 92d can be inserted into the diametrical bore 93d and through the elongated hole 94d and the eyelet 90d. When the operating lever 64d is rotated in the direction of arrow 73d, the end portion 57d of the core member 54d extending beyond the support face 59d is shortened. This means that the pushing member 5d must be pushed downwards against the action of the pressurized fluid within the working chambers 37d and 38d. This is possible due to the vertically elongated shape of the hole 94d passing through the pushing member 5d.

One can recognize that in all embodiments as described before the end portion of the Bowden cable can be entered into a cavity structure and is fully protected against external mechanical loads. Moreover, one can see that minimum space is required for the introduction of the Bowden cable into the respective cylinder piston unit.

It is to be noted that in the embodiment of FIG. 3, the actuating mechanism 70 can be separated from the cylinder piston unit 32 by urging the sections of the guide sleeve 3 radially inwards and thereafter withdrawing the guide sleeve 3 from the cavity 61. In the embodiment of FIG. 6, the disassembling can be performed in removing the securing ring 78b and thereafter withdrawing the guide sleeve 3b from the cavity 61b.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. An actuating device in combination with a lockable cylinder piston unit, said cylinder piston unit comprising a cylinder unit having a cylinder unit axis and two ends and defining a cylinder cavity therein axially between said two ends, said cylinder piston unit further comprising a piston rod axially movable through at least one of said two ends, a piston unit connected to said piston rod inside said cylinder cavity and separating two fluid-filled working chambers from each other inside said cavity, fluid flow passage means interconnecting said two working chambers, valve means allocated to said fluid flow passage means for selectively opening or closing said fluid flow passage means, said valve means being operatively connected with a pushing member having a pushing axis, said pushing member being guided by pushing member guide means along said pushing axis, said fluid flow passage means being opened through said valve means in response to pushing said pushing member between a pushing member closing position and a pushing member opening position, said actuating device comprising a Bowden cable having a first end portion in operational connection with said pushing member and a second end portion in operational connection with a Bowden cable operating mechanism, said Bowden cable comprising a flexible tube member and a flexible core member guided within said flexible tube member, said flexible tube member having a first end portion adjacent said first end portion of said Bowden cable and said flexible core member having a first end portion adjacent said first end portion of said Bowden cable, said first end portion of said flexible tube member being supported in a direction substantially parallel to said pushing axis by said pushing member, said first end portion of said core member being fastened by fastening means substantially fixed with respect to said pushing member guide means at least in a direction parallel to said pushing axis.

2. An actuating device as set forth in claim 1, said first end portion of said core member extending beyond said first end portion of said tube member, said first end portion of said core member extending through internal core member passage means of said pushing member between an exit of said tube member and said fastening means.

3. An actuating device as set forth in claim 2, said core member passage means comprising a laterally open slot of said pushing member.

4. An actuating device as set forth in claim 2, said first end portion of said core member extending directly from said first end portion of said tube member toward a fastening location radially outside said pushing member and stationary with respect to said pushing member guide means.

5. An actuating device as set forth in claim 4 said first end portion of said core member extending from said first end portion of said tube member toward said fastening location along a path inclined with respect to said pushing axis.

6. An actuating device as set forth in claim 1, said tube member being supported by a tube member support face of said pushing member, said support face being substantially orthogonal with respect to said pushing axis.

7. An actuating device as set forth in claim 6, said tube member support face being adjacent lateral positioning means positioning said first end portion of said tube member with respect to said pushing member in directions transverse to said pushing axis.

8. An actuating device as set forth in claim 1, said first end portion of said tube member being received by a bore of said pushing member, which bore is substantially parallel or coaxial with respect to said pushing axis, said bore having a bottom face providing a support face for said tube member and a side face acting as lateral positioning means for said first end portion of said tube member, internal core member passage means extending inside said pushing member between said tube member support face and said fastening means.

9. An actuating device as set forth in claim 1, said first end portion of said tube member being provided with a tube member support sleeve supported by said pushing member.

10. An actuating device as set forth in claim 1, said pushing member guide means comprising a guide sleeve, said guide sleeve being inserted into a guide sleeve receiving cavity of said cylinder piston unit, a fastening means location for said first end portion of said core member being provided on said guide sleeve, said guide sleeve being fastened within said guide sleeve receiving cavity.

11. An actuating device as set forth in claim 10, said guide sleeve being fastened within said guide sleeve receiving cavity by snapping engagement means of said guide sleeve and said guide sleeve receiving cavity mutually engageable in response to inserting said guide sleeve into said guide sleeve receiving cavity.

12. An actuating device as set forth in claim 10, said guide sleeve being provided with at least one projection, said projection being engageable and preferably snappingly engageable into a recess adjacent said guide sleeve receiving cavity.

13. An actuating device as set forth in claim 1, said first end portion of said core member being engaged with a core member fastening means stationary with respect to said pushing member guide means and extending into recess means of said pushing member, said recess means permitting axial play to said pushing member with respect to said pushing member guide means.

14. An actuating device as set forth in claim 1, said pushing member being biased by resilient means toward said pushing member closing position.

15. An actuating device as set forth in claim 14, said resilient means being provided by a pressurized fluid within said working chambers, said pressurized fluid acting onto said pushing member through a valve body exposed to said pressurized fluid.

16. An actuating device as set forth in claim 1, said pushing member being integral with valve body shaft means of said valve means.

17. An actuating device as set forth in claim 1, said pushing member being in abutting engagement with valve body shaft means of said valve means.

18. An actuating device as set forth in claim 1, said pushing member having a Bowden cable side end face inside a guide means cavity of said guide means, said Bowden cable extending into said guide means cavity.

19. An actuating device as set forth in claim 1, said fluid flow passage means extending across said piston member through at least one of said piston member and said piston rod, said valve means being controllable through an axial bore of said piston rod, said pushing member guide means being provided at least partially inside said axial bore of said piston rod.

20. An actuating device as set forth in claim 1 said fluid flow passage means comprising an external bypass of said cylinder unit, said valve means being provided at an end of said cylinder unit remote from said piston rod.

21. An actuating device as set forth in claim 20, said pushing member being substantially coaxial with said cylinder unit axis.

22. An actuating device as set forth in claim 20, said cylinder unit comprising a tubular extension extending beyond a terminal plug member accommodating said valve means, a spacer sleeve being accommodated within said tubular extension axially adjacent said terminal plug member, said spacer sleeve accommodating said guide means.

23. An actuating device as set forth in claim 1, said cylinder piston unit being a pneumatic or hydropneumatic spring.

24. An actuating device as set forth in claim 1, said cylinder piston unit being a hydraulic or hydropneumatic locking device.

25. An actuating device as set forth in claim 1, said cylinder piston unit being a positioning unit for at least one of a seat member or a back rest member of a chair.

26. An actuating device as set forth in claim 1, said Bowden cable operating mechanism being provided on a chair at a position accessible to a person sitting on said chair.

27. For a combination of a lockable cylinder piston unit and an actuating device thereof, said cylinder piston unit comprising a cylinder unit having a cylinder axis and two ends and defining a cylinder cavity therein axially between said two ends, said cylinder piston unit further comprising a piston rod axially movable through at least one of said two ends, a piston unit connected to said piston rod inside said cylinder cavity and separating two fluid-filled working chambers from each other inside said cylinder cavity, fluid flow passage means interconnecting said two working chambers, valve means allocated to said fluid flow passage means for selectively opening or closing said fluid flow passage means, said valve means being operatively connected with a pushing member having a pushing axis, said pushing member being guided by pushing member guide means along said pushing axis, said fluid flow passage means being opened through said valve means in response to pushing said pushing member between a pushing member closing position and a pushing member opening position, said actuating device comprising a Bowden cable having a first end portion in operational connection with said pushing member and a second end portion in operational connection with a Bowden cable operating mechanism, said Bowden cable comprising a flexible tube member and a flexible core member guided within said flexible tube member, said flexible tube member having a first end portion adjacent said first end portion of said Bowden cable and said flexible core member having a first end portion adjacent said first end portion of said Bowden cable, said first end portion of said flexible tube member being supported in a direction substantially corresponding to said pushing axis by said pushing member, said first end portion of said core member being fastened by fastening means substantially fixed with respect to said pushing member guide means at least in a direction parallel to said pushing axis, a preassembled actuating device unit comprising said pushing member guide means, said pushing member and said Bowden cable with said first end portion of said core member being fastened to said guide means and said first end portion of said tube member being supportable by said pushing member, said guide means being shaped for fastening engagement with said cylinder piston unit.

* * * * *